United States Patent

Shekleton

[11] Patent Number: 5,097,660
[45] Date of Patent: Mar. 24, 1992

[54] COANDA EFFECT TURBINE NOZZLE VANE COOLING

[75] Inventor: Jack R. Shekleton, San Diego, Calif.

[73] Assignee: Sundstrand Corporation, Rockford, Ill.

[21] Appl. No.: 447,442

[22] Filed: Dec. 7, 1989

Related U.S. Application Data

[63] Continuation-in-part of Ser. No. 291,056, Dec. 28, 1988, abandoned.

[51] Int. Cl.⁵ .............................................. F02C 1/00
[52] U.S. Cl. .................................... 60/39.75; 415/115
[58] Field of Search .............. 60/39.75, 39.83, 737, 60/738, 743, 752, 755, 760; 415/115; 416/97 R; 417/406, 407

[56] References Cited

U.S. PATENT DOCUMENTS

| | | |
|---|---|---|
| 2,149,510 | 3/1939 | Darrieus ........................ 410/97 R |
| 2,220,420 | 11/1940 | Meyer ........................... 416/97 R |
| 3,388,888 | 6/1968 | Kercher et al. . |
| 3,527,543 | 9/1970 | Howald . |
| 3,542,486 | 11/1970 | Kercher et al. ................. 415/115 |
| 3,806,274 | 4/1974 | Moore ............................ 416/97 R |
| 4,026,659 | 5/1977 | Freeman, Jr. . |
| 4,153,386 | 5/1979 | Leogrande et al. . |
| 4,162,136 | 7/1979 | Parkes ............................ 415/115 |
| 4,446,695 | 5/1984 | Burtis . |
| 4,721,433 | 1/1988 | Piendel et al. . |
| 4,767,261 | 8/1988 | Godfrey et al. . |
| 4,798,515 | 1/1989 | Hsia et al. . |

FOREIGN PATENT DOCUMENTS 1245218  7/1967  Fed. Rep. of Germany .... 416/97 R Primary Examiner—Richard A. Bertsch
Assistant Examiner—Timothy S. Thorpe
Attorney, Agent, or Firm—Wood, Phillips, Mason, Recktenwald & VanSanten

[57] ABSTRACT

Turbine nozzle vane cooling difficulties may be avoided in a gas turbine including a rotary compressor (10), (14) having a turbine wheel (10), (16) connected to the same; a nozzle (34) having a plurality of vanes (36) surrounding the turbine wheel (10), (16) for directing products of combustion thereat; and a combustor (28) for burning fuel and providing the products of combustion to the nozzle (34). The vanes (36) have elongated openings (54) in the leading edges (42) thereof, the openings terminating in generally parallel, curved surfaces (62), (64) that merge with the leading edges (42). The openings (54) are in fluid communication with the compressor (10), (14) and, as a consequence, compressed air flowing out of the openings (54) attaches itself to the surfaces (66), (68) of the leading edge (42) of the vanes (36) to provide exit cooling.

4 Claims, 1 Drawing Sheet

COANDA EFFECT TURBINE NOZZLE VANE COOLING

CROSS-REFERENCE

This application is a continuation-in-part of the commonly assigned, co-pending application of Jack R. Shekleton and Douglas C. Johnson, Ser. No. 291,056 filed Dec. 28, 1988 and entitled "Cooling of Turbine Nozzles."

FIELD OF THE INVENTION

This invention relates to the cooling of the vanes used in turbine engine nozzles and, more particularly, to the use of the Coanda effect to achieve enhanced cooling.

BACKGROUND OF THE INVENTION

As is well known, one significant factor in determining the life of a gas turbine engine revolves about the ability of the turbine nozzle to stand up to the temperatures of the hot gases of combustion that the nozzle receives from the engine combustor and directs against the turbine wheel. Too high temperatures will result in metal fatigue, while non-uniform temperatures will result in thermally generated stresses which will, over a period of time, literally pull the nozzle apart.

While there are many ways of attacking these problems, one approach focuses itself on the cooling of the vanes that make up a typical nozzle. Cooling the vanes typically involves locating one or more passages within each vane that pass a cooling fluid through such a passage. Quite frequently, a variety of apertures extend from the coolant passages within the vanes to the surfaces of the vanes so that a coolant, typically compressed air from the compressor section of the engine, is discharged into the stream of gases flowing to the turbine wheel. Many of these proposals are extremely complicated and expensive to implement due to the need for specialized conduits, the forming of a multiplicity of apertures and the like.

In the previously identified co-pending application, the details of which are herein incorporated by reference, there is disclosed a simplified means of cooling the vanes in a turbine nozzle. In particular, according to one embodiment disclosed therein, each vane, near its leading edge, includes a single internal passage that is connected to the discharge side of the turbine engine compressor to receive compressed air therefrom. An opening extends from the passage to the leading edge and opens thereat so that coolant first flows through each vane to cool the same by conduction and then is discharged at the leading edge to flow past the sides of the vanes to provide a further cooling effect.

The present invention is intended to be an improvement on the invention disclosed in the previously identified, prior application.

SUMMARY OF THE INVENTION

It is the principal object of the invention to provide a new and improved, but simple means of cooling the vanes in a turbine nozzle.

An exemplary embodiment of the invention achieves the foregoing object in a gas turbine including a rotary compressor, a turbine wheel connected to the compressor to drive the same, a nozzle having a plurality of vanes surrounding the turbine wheel for directing products of combustion thereat and a combustor for burning fuel to provide the products of combustion. The combustor has an outlet connected to the nozzle.

An elongated opening is disposed in the leading edge of each of the vanes and each said opening terminates in generally parallel, curved surfaces that smoothly merge into the leading edge. Means are provided to establish fluid communication between the openings and the compressor.

As a consequence of the foregoing structure, gas from the compressor exiting the openings will, as a result of the Coanda effect, attach itself to the curved surfaces and flow along the leading edge to assure good heat exchange contact and adequate cooling of the vanes.

In a preferred embodiment, a divider is located within each such opening for dividing the flow of gas therethrough into two streams, one for each side of each vane.

In a highly preferred embodiment, the divider is wedge-shaped with a pointed section extending into a corresponding one of the openings.

Preferably, the wedge-shaped dividers have side surfaces merging at the pointed section and the side surfaces are curved and generally parallel the adjacent one of the curved surfaces.

Other objects and advantages will become apparent from the following specification taken in connection with the accompanying drawings.

DESCRIPTION OF THE PREFERRED EMBODIMENTS

Figure 1:
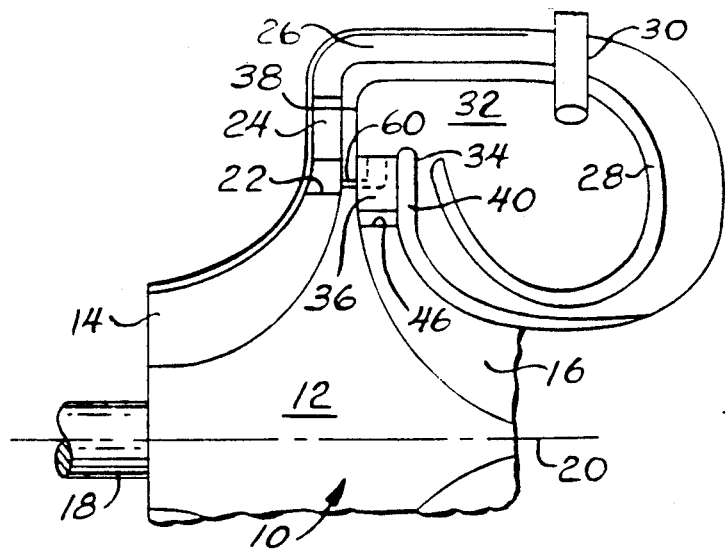
FIG. 1 is a somewhat schematic, fragmentary, sectional view of a gas turbine engine embodying the invention.

A typical turbine engine with which the engine may be employed is illustrated in FIG. 1 and with reference thereto is seen to include a rotor, generally designated 10, having a hub 12. On one side of the hub 12 are a plurality of compressor blades 14 to define a radial compressor. On the opposite side of the hub 12 are a plurality of turbine vanes 16 which define a turbine wheel. Because the two sets of blades 14 and 16 are on a single hub 12, it will be appreciated that the turbine wheel thus defined is connected to the compressor to drive the same. At the same time, it should be understood that while the construction illustrated and just described is what might be termed a "monorotor," the invention is not limited to such but will find utility in other arrangements where, for example, the compressor and the turbine wheel are completely separate, and even on separate axes.

A shaft 18 is connected to the rotor hub 12 and may be utilized to transmit power generated by operation of the engine to a point of use (not shown), as well as to journal the rotor 12 for rotation about an axis 20.

Radially outward of the tips 22 of the compressor blades 14 is a conventional diffuser 24 and the same discharges compressed air into a plenum 26 in which is disposed a conventional, annular combustor 28. By means known in the art, air from the compressor is utilized to cool the combustor 28, as well as to provide an oxidant for fuel injected into the combustor 28 by any one of a series of fuel injectors 30 (only one of which is shown).

The combustor 28 has an outlet area 32 through which hot gases of combustion pass to a turbine nozzle, generally designated 34 which directs such gases radially inward against the blades 16 to power the engine. The nozzle 34 is typically made up of a series of vanes 36 which extend between the front turbine shroud 38 and the rear turbine shroud 40 as is well known.

Figure 2:
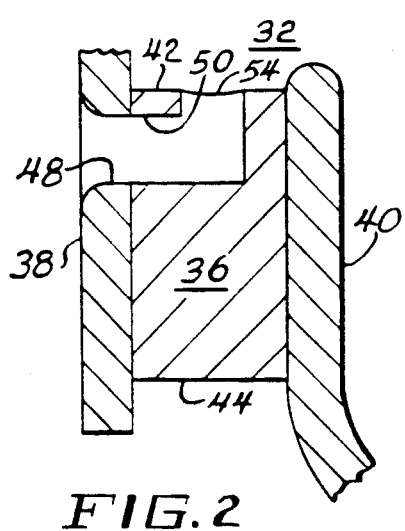
FIG. 2 is an enlarged, fragmentary sectional view of a vane in a turbine nozzle and made according to the invention.

As seen in FIG. 2, each vane 36 has a leading edge 42 and a trailing edge 44. The leading edge 42 will, of course, be right at the combustor outlet 32, while the trailing edge 44 will be adjacent radially outer tips 46 (FIG. 1) of the turbine blades 16.

Figure 3:
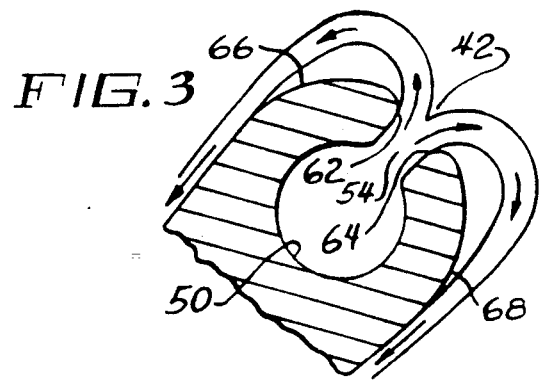
FIG. 3 is an enlarged, fragmentary sectional view of one embodiment of the invention.

With reference to FIGS. 2 and 3, at the location at each of the vanes 36, the front shroud 38 is provided with a bore 48 which aligns with a bore 50 closely adjacent the leading edge 42 and located within the vane 36. The bore 50 is parallel to the leading edge 42 and extends more than a majority of the way across the vane 36. Near the center of the vane, the leading edge 42 is provided with an elongated opening 54 that is in fluid communication with the passage and thus the bore 48.

The bore 48, in turn, is in fluid communication with the discharge side of the compressor as, for example, by means of a conduit shown somewhat schematically in FIG. 1 at 60. Preferably, however, the connection will be downstream of the diffuser 24 and may be as disclosed in the previously identified co-pending application. In any event, compressed air from the compressor can be flowed through the passage 50 to cool each of the vanes 36 and then discharged from the openings 54 in the vanes to flow along the sides of the vanes to cool the same.

To enhance this cooling effect, the opening 54 is elongated along the leading edge 42. Furthermore, the elongated sides of the opening 54 are curved as illustrated at 62 and 64 in FIG. 3 so as to smoothly merge into the leading edge 42. That is to say, the openings 54 are not ordinary bores or machined slots but, rather, smoothly curved so that the gas exiting the passage 50 through the opening 54 will not encounter a sharp edge. As a consequence of this construction, the Coanda effect is operative to cause the emanating streams to attach themselves to the adjacent exterior surfaces 66 and 68 on either side of the mid-point of the leading edge 42, notwithstanding the fact that hot gas from the combustor 28 will be flowing in the opposite direction as the gas from the compressor emerges from the openings 54. This attachment of the emanating air streams not only assures that the air streams will be in contact with the vanes 36 to cool the same, it also provides buffering streams to isolate the vanes 36 from direct contact with the hot gases of combustion thereby allowing the vanes 36 to operate more coolly.

Figure 4:
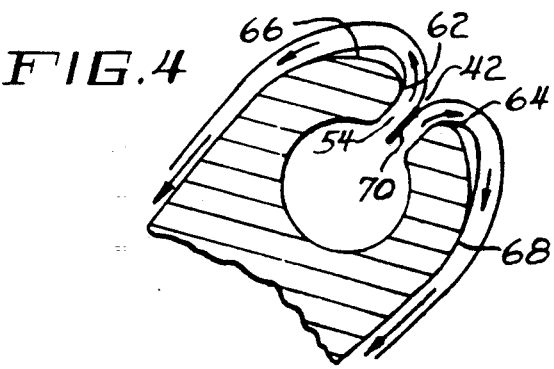
FIG. 4 is a view similar to FIG. 3 but of another embodiment of the invention.
Figure 6:
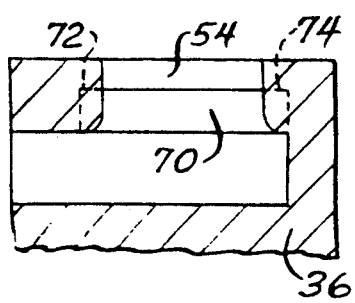
FIG. 6 is a sectional view.

FIG. 4 shows a further embodiment of the invention and one that is preferred over FIG. 3. In the embodiment of FIG. 4, a thin baffle or divider 70 approximately parallels the sides of the opening 54 and is located midway between the two. As a result, it provides positive assurance that the air exiting the openings 54 will be divided into two discrete streams, one for each of the sides 66 and 68. FIG. 6 illustrates the disposition of the flow divider 70 in the opening 54, the same being anchored at its respective ends 72 and 74 within the vanes 36.

Figure 5:
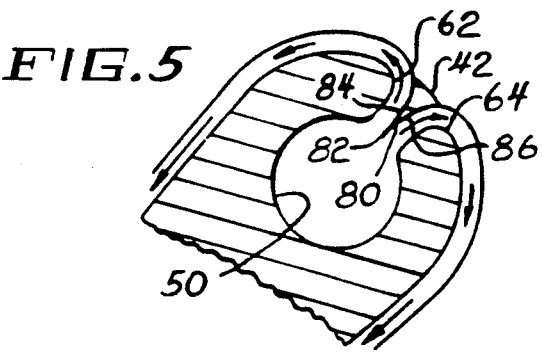
FIG. 5 is a view similar to FIGS. 3 and 4 but of still another embodiment of the invention.

Still another embodiment and a highly preferred embodiment is illustrated in FIG. 5. In this embodiment, a flow divider 80 much like the flow divider 70 is utilized, except that the flow divider 80 is wedge-shaped as illustrated. That is to say, the flow divider 80 has a pointed section 82 which extends into the opening 54 towards the passage 50. Adjacent side surfaces 84 and 86 merge at the pointed section. The side surfaces 84 and 86 of the wedge-shaped flow divider are curved and are somewhat concave as illustrated in FIG. 5. It will be appreciated from FIG. 5 that the same generally parallel, that is, are generally concentric width, the curved surfaces 62 and 64 forming the sides of the openings 54. Thus, the flow divider 80 not only serves to divide the flow into two discrete streams, but further serves to direct the flow at the curved surfaces 62 and 64 to minimize any possibility of separation.

From the foregoing, it will be readily appreciated that the invention advantageously makes use of the Coanda effect to achieve enhanced cooling of the vanes employed in a turbine nozzle. Consequently, the invention will provide for longer life turbines.

I claim:
1. A gas turbine including:
   a rotary compressor;
   a radial inflow turbine wheel connected to said compressor to drive the compressor;
   a nozzle having a plurality of vanes surrounding said turbine wheel for directing products of combustion thereat;
   a combustor for burning fuel to provide said products of combustion and having an outlet connected to said nozzle;
   an elongated opening in the leading edge of each of said vanes, each said opening terminating in generally parallel curved surfaces smoothly merging into said leading edge;
   means establishing fluid communication between said openings and said compressor; and,
   a divider within each said opening for dividing the flow of gas therethrough into to two streams, each said divider being wedge-shaped with a pointed section extending into a corresponding one of said openings.

2. The gas turbine of claim 1 wherein said wedge-shaped dividers have side surfaces merging at said pointed section, said side surfaces being curved and generally paralleling the adjacent one of said curved surfaces.

3. A gas turbine including:
   a rotary compressor;
   a radially inflow turbine wheel connected to said compressor to drive the compressor;
   a nozzle having a plurality of vanes surrounding said turbine wheel for directing products of combustion thereat;
   a combustor for burning fuel to provide said products of combustion and having an outlet connected to said nozzle;
   an elongated opening in the leading edge of each of said vanes, each said opening terminating in generally parallel curved surfaces smoothly merging into said leading edge so that gas exiting said openings will attach itself to said leading edges by the coanda effect to cool said vanes;

a conduit extending between said compressor and said openings; and a flow divider in each said opening to divide the exiting gas into two streams, one stream attaching itself to one side of said leading edge and the other stream attaching itself to the other side of said leading edge, each said flow divider being wedge-shaped with a pointed section extending into a corresponding one of said openings.

4. A gas turbine including:

a rotary compressor;

a radial inflow turbine wheel connected to said compressor to drive the compressor;

a nozzle having a plurality of vanes surrounding said turbine wheel for directing products of combustion thereat;

a combustor for burning fuel to provide said products of combustion and having an outlet connected to said nozzle;

an elongated opening in the leading edge of each of said banes, each said opening terminating in generally parallel curved, convex surfaces smoothly merging into said leading edge so that gas exiting said openings will attach itself to said leading edges by the coanda effect to cool said vanes;

a conduit extending between said compressor and said openings; and an elongated flow divider in each said opening and having concave sides generally parallel to and concentric with said curved surfaces.

* * * * *